United States Patent Office 2,900,446
Patented Aug. 18, 1959

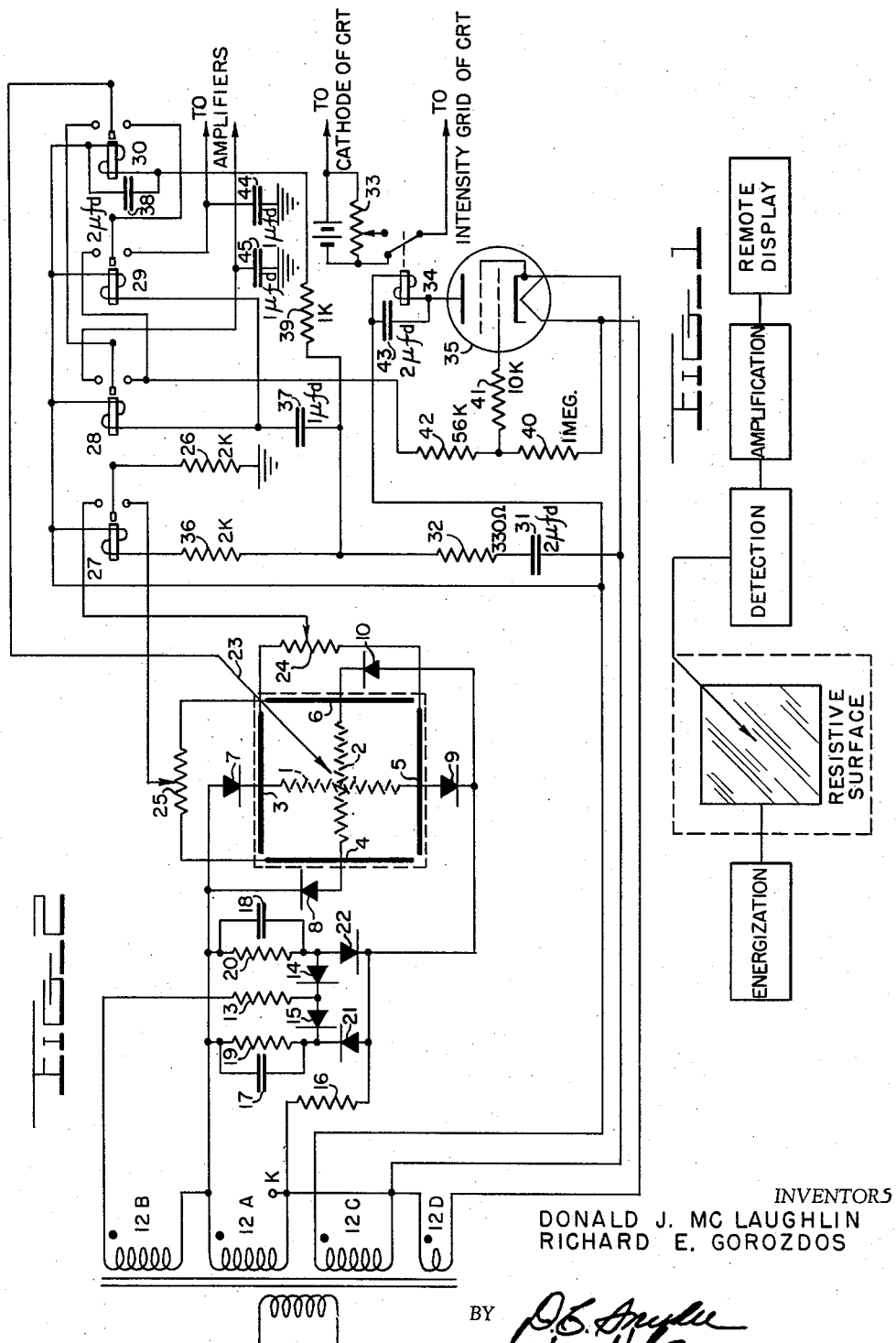

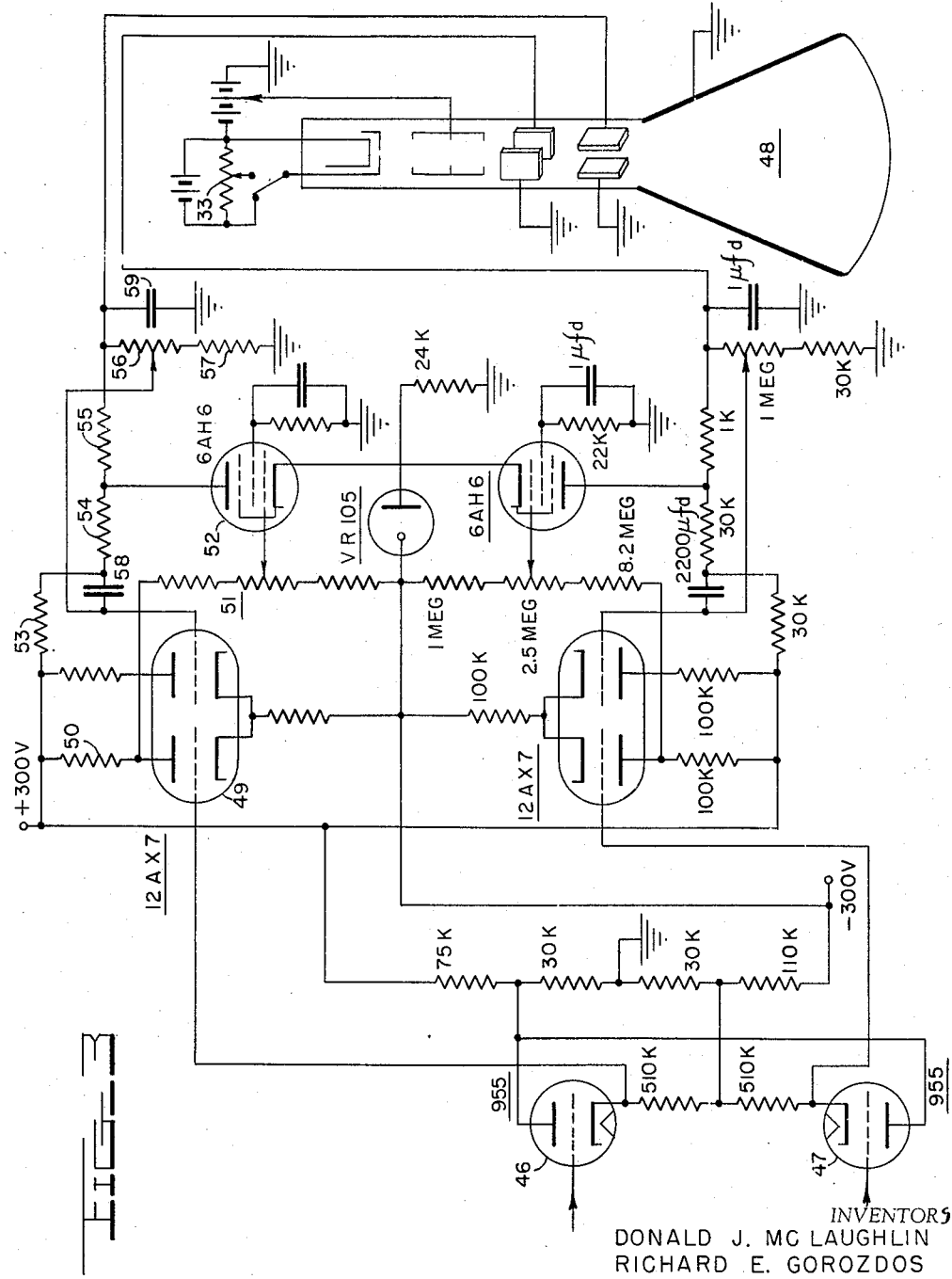

2,900,446
TELESCRIBER SYSTEM

Donald J. McLaughlin and Richard E. Gorozdos, Washington, D.C., assignors to the United States of America as represented by the Secretary of the Navy Application March 2, 1954, Serial No. 413,734
9 Claims. (Cl. 178—18)
(Granted under Title 35, U.S. Code (1952), sec. 266)

The invention described herein may be manufactured and used by or for the Government of the United States of America for governmental purposes without the payment of any royalties thereon or therefor.

This invention relates in general to devices for transferring information and in particular to devices which energize a visual display and detect proportional energies in sequence at several points on said display to permit a transfer of visual information to a remote display.

Devices for transmitting visual information which utilize the basic principle that a point on a visual display may be identified in terms of proportional electrical signals for the $x$ and $y$ coordinates of that point are generally known as telescriber systems. It is common in such systems to utilize a resistive surface as a writing or tracing board, to energize this resistive surface across orthogonal axes by the application of separately distinguishable alternating voltages or intermittent direct voltages and to employ a conductive probe as a writing or tracing stylus to contact the resistive surface. Generally the $x$ and $y$ information is developed across simple R.C. networks and then transferred to a remote display unit such as a high persistent cathode ray tube where it is applied to reproduce the original display. Said R.C. networks, storage condensers with their parallel resistance discharge paths, introduce a critical time constant which must be sufficiently long to maintain a substantially constant voltage output in spite of the alternating or intermittent energization and sufficiently short to follow the movement of the probe stylus. It is recognized by those familiar in the art that the selection of component values involves a compromise of requirements rendering it impossible to produce a usable constant voltage output which will immediately follow the writing instrument and which at the same time may be stored over a reasonable period of time.

It is an object of this invention to provide a fast response telescriber system capable of following any writing speed.

It is also an object of this invention to provide a telescriber system having an alternating voltage excitation means for the resistive surface and a means synchronous with the excitation means for detecting electrical signals proportionate to the $x$ and $y$ coordinates of a point on said surface.

It is a further object of this invention to provide a telescriber system in which the resistive surface may be used to dissipate previously stored information.

Other objects will become apparent from a better understanding of the invention for which reference is had to the accompanying drawings and description of this invention.

In the accompanying drawings:

Figure 1 is a block diagram of one embodiment of this invention.

Figure 2 is a schematic drawing of one embodiment of the energization and detection means shown in the block diagram of Figure 1.

Figure 3 is a schematic drawing of one embodiment of the amplification and display means shown in the block diagram of Figure 1.

Briefly, this invention comprises the utilization of a low voltage source to alternately energize the orthogonal axes of a resistive writing surface of comparatively low resistance and, synchronous with the energization, the detection of the two voltages at any selected point on said surface representative of the coordinate position of said point on said surface. In the invention capacitive storage means are provided to store the detected voltage information. By use of a switching network in the synchronous detection means, the storage means are permitted to immediately dissipate any previous information, when new information is detected, through the resistance of the writing surface. The invention includes a means for amplifying the voltage information which is then applied to a remote display which will reproduce the movement of the probe on the energized surface.

Referring now to the drawings in more detail:

Figure 1 is a block diagram showing a resistive surface with energization means therefor. In accordance with this invention the resistive surface is shown connected to a remote display through detection and amplification means. For a more comprehensive understanding of the blocks in Figure 1, reference is had to the schematic diagrams shown in Figures 2 and 3.

Figure 2 shows a schematic diagram of a preferred embodiment of the energization and detection means for the resistive surface. This surface may be any substantially uniform resistance surface, for example a square carbon plate or an electrically conductive coating on a square sheet of glass, with suitable electrodes attached to each of the four edges of the surface. The resistive surface may be represented by the two crossed resistances, 1 and 2, shown in dotted form between opposite electrodes 3, 5 and 4, 6, respectively. An alternating low voltage source from secondary transformer winding 12A, is applied through a resistance 16 across the resistance 1 in series with two unidirectional conducting elements 7 and 9, and across the resistance 2 in series with two unidirectional conducting elements 8 and 10. Unidirectional elements 7 and 9 in series with resistance 1 are oppositely polarized with respect to unidirectional elements 8 and 10 in series with resistance 2. Storage condensers 17 and 18 with discharge resistances 19 and 20, respectively, in parallel, are connected through oppositely polarized unidirectional elements 15 and 14 respectively, and across secondary transformer winding 12B and a resistance 13 in series. It is apparent therefore that transformer winding 12B will alternately charge the storage condensers 17 and 18 in opposite polarity due to said unidirectional elements 15 and 14 in the respective charging path of each condenser. Condensers 17 and 18 are connected across the resistances 1 and 2 through oppositely polarized unidirectional elements 21 and 22, respectively, to provide a clipping-clamping of the alternatnig excitation voltage, which will be described in more detail hereafter.

Potentiometers 24 and 25 are shown connected in parallel with surface resistance 1 and orthogonal surface resistance 2, respectively. The variable taps on said potentiometers may be alternately grounded, as described in more detail hereafter, through resistance 26 by means of relay 27. As said potentiometers are in parallel with the surface resistance, it can be seen that any reference voltage point on said surface may be established by adjustment of the taps on said potentiometers.

In this invention electrical switching means are provided for the detection of $x$ and $y$ coordinate voltages at a point on the resistive surface. In the drawing a conductive probe 23 is shown to contact the resistive surface at any selected point on said surface. Said probe is connected to the movable contact of one of said switching means, relay 30. Also as shown, transformer winding 12C provides a source of alternating voltage for the operational control of the relays 27, 28, 29 and 30, which may be commercially available AirPax Type A-586 or the equivalent. All of said relays have an inherent mechanical delay and their actuating inductances are therefore connected to the voltage source through condenser 31 to compensate for this delay by introducing a phase advance, and through the series resistance 32. As previously described, switch 27 alternately grounds the variable tap on one or the other of potentiometers 24 and 25, in parallel with surface resistances 1 and 2 respectively, during each half cycle of surface energization. In a similar manner relay 30 alternately connects the probe 23 to the movable contact of relay 28 during one half cycle of energization of its actuating inductance and to the movable contact of relay 29 during the other half cycle of said energization. In dependence on the position of relay 30, either relay 28 or 29 connects the probe 23 first to the grid of a grid controlled thyratron tube 35, next to storage means 44 or 45 and then back to the grid of said thyratron tube. In Figure 2 the actuating inductances of relay 27, relays 28 and 29, and relay 30 are connected to the voltage source 12C through voltage dropping resistance 36 in series, through condenser 37 in series, and through condenser 38 in parallel and voltage dropping resistance 39 in series, respectively. Accordingly, relay 27 will operate in phase with the voltage source 12C, relays 28 and 29 will lead the phase of relay 27 and relay 30 will lag the phase of relay 27. A more complete explanation of the concurrent operation of said relays will be described hereafter in the operational analysis of this invention.

Transformer winding 12C is also applied across the plate and cathode of the thyratron 35, type 2D21 or the equivalent, through the actuating inductance of relay 34 in the plate circuit of said thyratron. An alternating voltage source, transformer winding 12D, is connected across the filament of said thyratron and to one end of transformer winding 12C to heat the cathode and to supply an alternating bias voltage, one half cycle out of phase with the voltage on the plate of tube 35, to the control grid across grid bias resistance 40 and grid current limiting resistance 41 connected in series between filament and grid of said thyratron. A current limiting resistance 42 is connected between said grid through resistance 41 and through the relays 28, 29 and 30 to the conductive probe 23 to inhibit a bias current discharge through the surface resistance. A condenser 43 is connected across the actuating inductance of relay 34 to develop a voltage when the thyratron is conducting which will hold the relay closed for the next half cycle during which the thyratron is not conducting due to a negative voltage on the plate. The switch contacts of relay 34 connect the intensity grid of cathode ray tube 48 of Figure 3 to either of two taps on bias source 33. These are arranged so that when the relay is open the grid is connected to the more negative tap on the bias source to decrease the beam intensity. The tap for the closed position of the relay as shown as variable and may be used as the brilliance control. If desirable, the other tap may also be variable.

Figure 3 is a schematic diagram of a preferred embodiment of the amplification means and remote display shown in Figure 1. The amplification means, more fully described hereafter, includes a high impedance cathode follower and a feedback controlled twin triode difference amplifier which are used to operate a display device of the cathode ray type disclosed. In the drawing probe voltages are developed across condensers 44 and 45 and applied to the grids of cathode followers 46 and 47 respectively. As both of said cathode followers are connected to the deflection system of cathode ray tube 48 through identical channels, only one channel will be described herein.

The cathode of cathode follower 46 is connected to the grid of a first triode in difference amplifier 49 and controls the current through said triode which, due to plate load resistance 50 of said triode, varies the voltage at its plate. Said plate is connected across a resistance network 51 which together with resistance 50 forms a voltage divider network. Resistance 51 is tapped to provide a bias voltage for the control grid of a high gain pentode amplifier 52 and controls the current through said pentode which, due to plate load resistances 53 and 54, varies the voltage at its plate. The plate of said pentode is connected through resistance 55 across potentiometer 56 and current limiting resistance 57 to ground which together with resistances 53 and 54 form a voltage divider network. The adjustable tap on potentiometer 56 is connected to the grid of the second triode in amplifier 49 to provide a feedback bias voltage to said second triode. Condenser 58 is also connected between plate load resistance 53 and 54 and the grid of said second triode of amplifier 49 to promptly feed back any variation of the plate voltage of amplifier 52. Condenser 59 is connected between resistance 55 and potentiometer 56 to ground, and with said resistance 55 provides a time constant circuit which limits the amplifier bandwidth so the pentode circuit will not oscillate.

For a more extensive evaluation of this invention, reference is had to the actual component values in the described embodiments as shown in Figures 2 and 3. In such an evaluation of this invention the secondary windings 12A, B, C and D of transformer 12 may be considered to supply R.M.S. alternating voltages of 75 volts, 30 volts, 110 volts and 6.3 volts respectively. For simplification in the drawing, all secondary windings are shown separately but is understood that this is not essential to the invention, for example, voltage source 12A might be a tap on the winding 12C. Particular reference is had to the polarity of the secondary windings of transformer 12. As indicated in the drawings by reference dots, all said secondary windings 12A, B, C and D are in phase.

In the operational analysis of this invention, when the voltage 12A, which energizes the resistive surface, exceeds the voltage stored in condensers 17 and 18 by voltage 12B through resistance 13 and unidirectional elements 14 or 15, it will have to charge condenser 17 or 18 to a higher value through resistance 16 and unidirectional element 21 or 22 before the voltage across resistance 1 or 2 can exceed the stored 12B voltage. This tends to reshape the sinusoidal voltage 12A into a clipped, substantially square alternating voltage to produce an effectively constant voltage energization source for the resistive surface.

Further considering the switching circuitry of the detection means of this invention and the phase relation of the relays 27, 28, 29 and 30, it is seen that the adjustable taps on potentiometers 24 and 25 are alternately grounded through resistance 26 in synchronism with the excitation of their respective resistances 1 and 2 to permit a distinct voltage takeoff with respect to ground at the probe contact point during each half cycle. As the excitation voltage is constant for a substantial part but not the entire duration of each half cycle, relay 30, due to condenser 38, lags the reference excitation phase to delay the application of coordinate voltage information to the grid of cathode follower 46 or 47 through relay 28 or 29, respectively, until the excitation voltage becomes constant. Likewise, relays 28 and 29 lead the reference excitation phase to prevent the application of inaccurate coordinate voltage information to the grid of said cathode followers when the constant excitation voltage drops. Consequently, there will be six different switch position combinations hereafter called periods, during each complete cycle of relay energization. As previously discussed, the relay 27 is in phase with the surface excitation and, for convenience, this phase shall be considered the reference phase.

Accordingly, at the start of a positive voltage half cycle in reference phase, period A, with resistance path 1 excited, relay 27, up, relays 28 and 29 up, relay 30 down and the probe in first contact with the writing surface, the probe voltage with respect to point K at one end of winding 12A, is applied through relay 30 and relay 29 to the grid of thyratron 35 which is non-conducting due to the positive voltage on the plate with a negative cutoff voltage from winding 12D on the grid. Said probe voltage makes the grid more positive to fire the thyratron which conducts and energizes relay 34 to close its contacts and increase the beam intensity in the display means. In period B, relay 30 flies up with all other relays holding and the y coordinate probe voltage with respect to ground is applied through relay 28 across storage condenser 45 to the grid of cathode follower 47. Period C, relays 28 and 29 fly down and all other relays hold and the probe voltage is applied through relay 30 and relay 28 to the grid of the conducting thyratron. Period D, at the start of the negative voltage half cycle with resistance path 2, excited, relay 27 flies down, all other relays hold, and the probe voltage remains applied through relay 30 and relay 28 to the grid of thyratron 35 which is now non-conducting due to the negative voltage on the plate. During period D the relay 34 remains energized because its winding becomes the main current discharge path for condenser 43. Period E, with relay 34 still energized by the condenser 43 discharge current, relay 30 flies down, all other relays hold, and the x coordinate probe voltage with respect to ground is applied through relay 29, across storage condenser 44 to the grid of cathode follower 46. Period F, relays 28 and 29 fly up, all other relays hold, and the probe voltage is applied through relay 30 and relay 28 to the grid of thyratron 35 which is still non-conducting due to the negative voltage on the plate. Again, period A, resistance 1 is excited, relay 27 up, relays 28 and 29 up, relay 30 down, and the process continues as before throughout the complete cycle.

The discharge path through the combined resistance of 1, 24 and 26, or 2, 25 and 26 is of sufficiently low value to provide a very short time constant circuit in combination with its respective storage condenser 44 or 45. Thus the voltage on these condensers will be readily changed to any new value of probe voltage by charging or discharging through these discharge paths. However, this short time constant circuit is in operation only when the resistive surface is supplying voltage information to the storage condensers. When either condenser is performing its storage function and is not connected to the resistive surface, it has a very high resistive discharge path through the input circuits of cathode followers 46 and 47. Storage is required because the alternate excitation of the x and y coordinates means voltage can be supplied to each of condenser 44 or 45 during less than one half cycle of each complete cycle of excitation.

When the probe is removed from the surface, it can be seen that the voltages on condensers 44 and 45 remain substantially unchanged due to the high impedance of the new discharge paths through the cathode followers. To reduce the possibility of cathode follower grid current charging said storage condensers during this period, the filaments of said cathode followers may be operated at a reduced voltage, substantially one half normal voltage. If the thyratron is conducting when the probe is removed it will continue to conduct until the plate becomes negative. Thereupon the thyratron ceases to conduct and its grid biased at cutoff takes over while the condenser 43 discharge current holds relay 34 contacts momentarily.

To obtain the linearity advantages of the amplification means of this invention, a quiescent condition must first be established in the difference amplifier by the adjustment of the amplifier 52 bias tap on resistance 51 and the feedback voltage tap on potentiometer 56 to provide a voltage on the grid of the second triode in amplifier 49 equal to the voltage on the grid of the first triode in amplifier 49. After the difference amplifier 49 has been balanced, a more positive probe voltage applied to the grid of cathode follower 46 will increase the voltage on the grid of the first triode in amplifier 49 which will increase current flow through said triode and reduce the voltage at its plate and at the grid of amplifier 52. With less voltage on the grid, tube current through amplifier 52 decreases to raise its plate voltage. This positive change in plate voltage is immediately fed back to the grid of the second triode in amplifier 49 through the condenser 58 to momentarily increase the conductivity of said second triode and raise the voltage at the common cathode of the amplifier 49 which in turn tends to decrease current flow through the first triode and thus provide negative or degenerative feedback to insure linear amplification. It should be understood that a more negative probe voltage would operate in a manner similar to that described above for the more positive probe voltage.

An output at the plate of amplifier 52 representative of one coordinate of the probe position, which is constant if the probe is not moving and varying if the probe is moving, is connected to one pair of deflection plates in the deflection system of a cathode ray display device to reproduce the y coordinate probe activity. With the x coordinate voltage information developed across storage condenser 45 connected through a similar amplification means to the orthogonal pair of deflection plates in said display device, a true reproduction of any probe position is obtained. The cathode ray display device has a high persistence screen which permits a true record of the movement of said probe on the energized surface. When the probe is removed from the resistive surface it is seen that voltage information representative of a single point will still be applied to the display device from the storage condenser. When said probe is removed, relay 34 opens and increases the bias on C.R.T. 48 thereby decreasing the intensit of the electron eam to avoid over exposing a single area of the cathode ray tube screen with a high intensity beam. It is within the purview of this invention that additional contacts of relay 34 may be connected to control the operation of other circuitry in the present invention such as to change the routing and use of voltage information.

By the invention herein, a means has been disclosed for developing a substantially constant voltage for alternately energizing a semi-conductive surface across opposite pairs of quadraturely disposed terminals, and a means for the simultaneous detection of coordinate voltage information by a synchronous switching network which will detect only during the period of constant energization voltage. Inherent in this invention are the advantages of a high RC time constant in the storage condenser circuits to retain steady coordinate voltage information during the alternate energization, and a low RC time constant in each storage condenser circuit when the probe is connected to said storage circuit and the writing surface which permits the output to instantaneously follow the movement of the probe. When it is desirable to retain coordinate voltage information for a considerable period after the probe has been removed from the writing surface, experience has shown that it may be desirable to disconnect the storage condensers 44 and 45 from the relays 28—30. It is advisable if these continuously operating relays alternately connect an appreciable stray wiring capacitance across the condensers 44 and 45 which gradually tends to equalize the stored voltages. Should this disconnection be desirable it may be accomplished by the simple expediency of connecting said storage condensers to their respective relays through additional switch contacts on relay 34 to act in unison with the relay 34 switch contacts shown.

The balanced D.C. feedback amplifier shown in Figure 3 will provide an operating device of high linearity but it is understood by those familiar in the art that if amplification of the voltage is necessary other amplification systems may be used.

Further, referring now to the excitation and detection means, it is understood the described current limiting and voltage dropping resistances in the embodiments shown do not constitute essential elements of this invention and are included only to protect other components of the circuit or in the case of resistances 36 and 39 to permit the use of similar switching devices for each of the relays 27, 28, 29 and 30. Similarly, it is understood that an appropriate relay unit might be substituted for the thyratron circuit of this invention if a tubeless detection means is desired. Moreover, this invention is not to be restricted to the drawings and description contained herein but is to be limited only by the scope of the appended claims.

What is claimed is:

1. A telescriber system which comprises a substantially uniform resistive surface, a voltage source, voltage applying means for alternately applying said voltage source across orthogonal resistance paths on said surface, means for establishing a voltage reference line on said surface in perpendicular relation to each of said orthogonal resistance paths during the energization of each respective path, a probe positionable at any point on said surface, a pair of voltage storage circuits, switching means, means directly connecting said probe to said switching means, means directly connecting said voltage storage circuits to said switching means, said switching means operative to connect a portion of one of said resistance paths directly across one of said voltage storage circuits and a portion of the other of said resistance paths directly across the other of said voltage storage circuits in alternate order, said portion being that part of each respective path between its respective voltage reference line and the position of said probe on said surface, synchronizing means actuating said switch means synchronously with said voltage applying means such that each of said voltage storage circuits is connected across said portion of its respective resistance path during the energization thereof, and a display means connected to said storage circuits and responsive to the magnitude of the voltage stored.

2. A telescriber system which comprises a substantially uniform resistive surface, an alternating voltage source, clipping means connected to said alternating source, oppositely poled rectifier means separately connecting said clipping means to orthogonal resistance paths on said surface, means for establishing a voltage reference line on said surface in perpendicular relation to each of said orthogonal resistance paths during the energization of each respective path, a probe positionable at any point on said surface, a pair of voltage storage circuits, switching means, means directly connecting said switching means to said resistive surface, means directly connecting said voltage storage circuits to said switching means, said switching means operative to connect a portion of one of said resistance paths directly across one of said voltage storage circuits and a portion of the other of said resistance paths directly across the other of said voltage storage circuits in alternate order, said portion being that part of each respective path between its respective voltage reference line and the position of said probe on said surface, said switching means being synchronized with the alternation of said voltage source such that each of said voltage storage circuits is connected across said portion of its respective resistance path during the energization thereof, and a display means connected to said storage circuits and responsive to the magnitude of the voltage stored.

3. A telescriber system which comprises a substantially uniform resistive surface, an alternating voltage source, clipping means connected to said alternating source, oppositely poled rectifier means separately connecting said clipping means to orthogonal resistance paths on said surface, centering resistance means connected in parallel with each of said resistance paths for establishing a voltage refrence line on said surface in perpendicular relation to each of said orthogonal resistance paths during the energization of each respective path, a probe positionable at any point on said surface, a pair of voltage storage circuits, switching means, means directly connecting said probe to said switching means, means directly connecting said voltage storage circuits to said switching means, said switching means operative to connect a portion of one of said resistance paths directly across one of said voltage storage circuits and a portion of the other of said resistance paths directly across the other of said voltage storage circuits in alternate order, said portion being that part of each respective path between its respective voltage reference line and the position of said probe on said surface, said switching means being synchronized with the alternation of said voltage source, such that each of said voltage storage circuits is connected across said portion of its respective resistance path during the energization thereof, a portion of said switching being phased to ground centering resistances in parallel with each of said resistance paths during the energization of each of said paths by said voltage source, and a display means connected to said storage circuits and responsive to the magnitude of the voltage stored.

4. A telescriber system which comprises a substantially uniform resistive surface, an alternating voltage source, a pair of opposite polarity reference voltage sources of respectively lower magnitude than the peak to peak voltage of said alternating source, means clamping the peaks of said alternating voltage source to said reference voltages, oppositely poled rectifier means separately connecting said clamping means to orthogonal resistance paths on said surface, means for establishing a voltage reference line on said surface in perpendicular relation to each of said orthogonal resistance paths during the energization of each respective path, a probe positionable at any point on said surface, a pair of voltage storage circuits, switching means, means directly connecting said switching means to said resistive surface, means directly connecting said voltage storage circuits to said switching means, said switching means operative to connect a portion of one of said resistance paths directly across one of said voltage storage circuits and a portion of the other of said resistance paths directly across the other of said voltage storage circuits in alternate order, said portion being that part of each respective path between its respective voltage reference line and the postion of said probe on said surface, said switching means being synchronized with the alternation of said alternating voltage source such that each of said voltage storage circuits is connected across said portion of its respective resistance path during the energization thereof, and a display means connected to said storage circuits and responsive to the magnitude of the voltage stored.

5. A telescriber system which comprises a substantially uniform resistive surface, an alternating voltage source, a pair of opposite polarity reference voltage sources of respectively lower magnitude than the peak to peak voltage of said alternating source, a series resistor and a pair of oppositely poled rectifier means connecting one terminal of said alternating source to each of said reference sources, additional oppositely poled rectifier means respectively connecting each orthogonal path across the other alternating source terminal and the junction of said series resistance and pair of rectifier means, means for establishing a voltage reference line on said surface in perpendicular relation to each of said orthogonal resistance paths during the energization of each respective path, a probe positionable at ony point on said surface, a pair of voltage storage circuits, switching means, means directly connecting said probe to said switching means, means directly connecting said voltage storage circuits to said switching means, said switching means operative to connect a portion of one of said resistance paths directly across one of said voltage storage circuits and a portion of the other of said resistance paths directly across the other of said voltage storage circuits in alternate order, said portion being that part of each respective path between its respective voltage reference line and the position of said probe on said surface, said switching means being synchronized with the alternation of said alternating voltage source such that each of said voltage storage circuits is connected across said portion of its respective resistance path during the energization thereof, and a display means connected to said storage circuits and responsive to the magnitude of the voltage stored.

6. A telescriber system which comprises a substantially uniform resistive surface, an alternating voltage source, clipping means connected to said alternating source, oppositely poled rectifier means separately connecting said clipping means to orthogonal resistance paths on said surface, means for establishing a voltage reference line on said surface in perpendicular relation to each of said orthogonal resistance paths during the energization of each respective path, a probe positionable at any point on said surface, a pair of voltage storage circuits, switching means, means directly connecting said probe to said switching means, means directly connecting said voltage storage circuits to said switching means, said switching means operative to connect a portion of one of said resistance paths directly across one of said voltage storage circuits and a portion of the other of said resistance paths directly across the other of said voltage storage circuits in alternate order, said portion being that part of each respective path between its respective voltage reference line and the position of said probe on said surface, said switching means being synchronized with the alternation of said voltage source such that each of said voltage storage circuits is connected across said portion of its despective resistance path during the energization thereof, a pair of voltage amplification means, each of said voltage amplification means having a relatively high impedance input, each of said storage circuits connected to the input of a respective one of said amplification means, and a display means connected to said amplification means and responsive to the magnitude of the voltage stored.

7. A telescriber system which comprises a substantially uniform resistive surface, an alternating voltage source, clipping means connected to said alternating source, oppositely poled rectifier means separately connecting said clipping means to orthogonal resistance paths on said surface, means for establishing a voltage reference line on said surface in perpendicular relation to each of said orthogonal resistance paths during the energization of each respective path, a probe positionable at any point on said surface, a pair of voltage storage circuits, switching means, means directly connecting said probe to said switching means, means directly connecting said voltage storage circuits to said switching means, said switching means operative to connect a portion of one of said resistance paths directly across one of said voltage storage circuits and a portion of the other of said resistance paths directly across the other of said voltage storage circuits in alternate order, said portion being that part of each respective path between its respective voltage reference line and the position of said probe on said surface, said switching means being synchronized with the alternation of said voltage source such that each of said voltage storage circuits is connected across said portion of its respective resistance path during the energization thereof, said storage circuits having a low resistance discharge path through said surface when connected to said probe and a relatively high resistance discharge path when not connected to said probe, and a display means connected to said storage circuits and responsive to the magnitude of the voltage stored.

8. A telescriber system which comprises a substantially uniform resistive surface, an alternating voltage source, a pair of opposite polarity reference voltage sources of respectively lower magnitude than the peak to peak voltage of said alternating source, a series resistor and a pair of oppositely poled rectifier means connecting one terminal of said alternating source to each of said reference sources, additional oppositely poled rectifier means respectively connecting each orthogonal path across the other alternating source terminal and the junction of said series resistance and pair of rectifier means, means for establishing a voltage reference line on said surface in perpendicular relation to each of said orthogonal resistance paths during the energization of each respective path, a probe positionable at any point on said surface, a pair of voltage storage circuits, switching means, means directly connecting said switching means to said resistive surface, means directly connecting said voltage storage circuits to said switching means, said switching means operative to connect a portion of one of said resistance paths directly across one of said voltage storage circuits and a portion of the other of said resistance paths directly across the other of said voltage storage circuits in alternate order, said portion being that part of each respective path between its respective voltage reference line and the position of said probe on said surface, only when said alternating voltage source exceeds one of said reference voltage sources, said switching means being synchronized with the alternation of said alternating voltage source such that each of said voltage storage circuits is connected across said portion of its respective resistance path during the energization thereof, and a display means connected to said storage circuits and responsive to the magnitude of the voltage stored.

9. A telescriber system which comprises a substantially uniform resistive surface, an alternating voltage source, clipping means connected to said alternating source, oppositely poled rectifier means separately connecting said clipping means to orthogonal resistance paths on said surface, means for establishing a voltage reference line on said surface in perpendicular relation to each of said orthogonal resistance paths during the energization of each respective path, a probe to contact said surface and positionable at any point thereon, a pair of voltage storage circuits, a first switching means, means directly connecting said probe to said first switching means, means directly connecting said voltage storage circuits to said first switching means, said first switching means operative to connect a portion of one of said resistance paths directly across one of said voltage storage circuits and a portion of the other of said resistance paths directly across the other of said voltage storage circuits in alternate order, said portion being that part of each respective path between its respective voltage reference line and the position of said probe on said surface, said first switching means being synchronized with the alternation of said voltage source such that each of said voltage storage circuits is connected across said portion of its respective resistance path during the energization thereof, a cathode ray tube display means having orthogonal deflection means connected to said storage circuits and responsive to the magnitude of the voltage stored, blanking means, a second switching means, control means for said second switching means operative responsive to the contact of said probe with said surface to disconnect said blanking means from said cathode ray tube.

References Cited in the file of this patent

UNITED STATES PATENTS

| | | |
|---|---|---|
| 2,000,014 | Du Mont | May 7, 1935 |
| 2,241,544 | Dreyer | May 13, 1941 |
| 2,269,599 | Moodey | Jan. 13, 1942 |
| 2,498,649 | Clark | Feb. 28, 1950 |
| 2,527,835 | Miller | Oct. 31, 1950 |
| 2,565,612 | Levin | Aug. 28, 1951 |